United States Patent
Chen

(10) Patent No.: US 10,142,895 B2
(45) Date of Patent: Nov. 27, 2018

(54) DEVICE AND METHOD OF HANDLING OFFLOAD PARAMETER ACCORDING TO CELL SELECTION

(71) Applicant: HTC Corporation, Taoyuan (TW)

(72) Inventor: Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 162 days.

(21) Appl. No.: 15/092,624

(22) Filed: Apr. 7, 2016

(65) Prior Publication Data

US 2016/0302112 A1   Oct. 13, 2016

Related U.S. Application Data

(60) Provisional application No. 62/146,028, filed on Apr. 10, 2015.

(51) Int. Cl.
*H04W 36/00* (2009.01)
*H04W 36/22* (2009.01)
(Continued)

(52) U.S. Cl.
CPC ... *H04W 36/0066* (2013.01); *H04W 36/0072* (2013.01); *H04W 36/22* (2013.01);
(Continued)

(58) Field of Classification Search
CPC ......... H04W 36/0066; H04W 36/0072; H04W 36/22; H04W 36/14; H04W 76/06; H04W 84/042; H04W 84/12
(Continued)

(56) References Cited

U.S. PATENT DOCUMENTS 8,417,244 B2   4/2013   Alonso-Rubio
2014/0169278 A1*  6/2014   Zhao ................... H04J 11/0053
370/328
(Continued)

FOREIGN PATENT DOCUMENTS

WO   2014182211 A1   11/2014

OTHER PUBLICATIONS

Office action dated Feb. 9, 2017 for the Taiwan application No. 105111050, filing date Apr. 8, 2016, p. 1-6.
(Continued)

*Primary Examiner* — Mark H Rinehart
*Assistant Examiner* — Natali Pascual Peguero
(74) *Attorney, Agent, or Firm* — Winston Hsu

(57) ABSTRACT

A communication device of handling an offload parameter according to a cell selection comprises a storage unit for storing instructions and a processing means coupled to the storage unit. The processing means is configured to execute the instructions stored in the storage unit. The instructions comprise receiving at least one dedicated wireless local area network (WLAN) offload parameter and a dedicated WLAN offload timer from a first cell in a connected mode; receiving a radio resource control (RRC) connection release message from the first cell; starting the dedicated WLAN offload timer; performing a cell selection procedure in response to the RRC connection release message; selecting a second cell according to the cell selection procedure; stopping the dedicated WLAN offload timer; and releasing the at least one dedicated WLAN offload parameter.

14 Claims, 5 Drawing Sheets

(51) Int. Cl.
*H04W 84/12* (2009.01)
*H04W 84/04* (2009.01)
*H04W 36/14* (2009.01)
*H04W 76/30* (2018.01)

(52) U.S. Cl.
CPC ............ *H04W 36/14* (2013.01); *H04W 76/30* (2018.02); *H04W 84/042* (2013.01); *H04W 84/12* (2013.01)

(58) Field of Classification Search
USPC .................................................. 370/331, 332
See application file for complete search history.

(56) References Cited

U.S. PATENT DOCUMENTS

2015/0078153 A1   3/2015   Kuo
2016/0255534 A1*  9/2016   Bergstrom ............ H04W 76/18
                                              370/230.1

OTHER PUBLICATIONS

3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 25.331 V12.5.0 (Mar. 2015) Technical Specification 3rd Generation Partnership Project; Technical Specification Group Radio Access Network; Radio Resource Control (RRC); Protocol specification (Release 12).

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

Search Report dated Aug. 31, 2016 for EP application No. 16164259.0, pp. 1-18.

3GPP TS 36.331 V12.5.0 (Mar. 2015), "3rd Generation Partnership Project; Technical Specification Group Radio Access Network; Evolved Universal Terrestrial Radio Access (E-UTRA); Radio Resource Control (RRC); Protocol specification (Release 12)", XP050928130, pp. 1-445.

3GPP TS 36.304 V12.4.0 (Mar. 2015), "3rd Generation Partnership Project; Technical Specification Group Radio Access Network; Evolved Universal Terrestrial Radio Access (E-UTRA); User Equipment (UE) procedures in idle mode (Release 12)", XP050952066, pp. 1-38.

3GPP TS 25.331 V12.5.0 (Mar. 2015), "3rd Generation Partnership Project; Technical Specification Group Radio Access Network; Radio Resource Control (RRC); Protocol specification (Release 12)", XP050952071, pp. 1-2225.

3GPP TS 25.304 V12.5.0 (Mar. 2015), "3rd Generation Partnership Project; Technical Specification Group Radio Access Network; User Equipment (UE) procedures in idle mode and procedures for cell reselection in connected mode (Release 12)", XP050952058, pp. 1-58.

HTC, "Correction on handling of dedicated parameters upon leaving RRC_CONNECTED", 3GPP TSG-RAN WG2 Meeting #89, R2-150329, Feb 9-13, 2015, Athens, Greece, XP050935629.

HTC, "Clarification on WLAN interworking", 3GPP TSG-RAN2 Meeting #88, R2-144761, Nov. 17-21, 2014, San Francisco, USA, XP050920585.

HTC, "Clarification on cell selection sequence upon leaving RRC_CONNECTED", 3GPP TSG-RAN WG2 Meeting #91, R2-153856, Aug. 24-28, 2015, Beijing, China, XP051023256.

HTC, "Clarification on cell selection sequence upon leaving RRC_CONNECTED", 3GPP TSG-RAN WG2 Meeting #91, R2-153917, Aug. 24-28, 2015, Beijing, China, XP051023114.

* cited by examiner

DEVICE AND METHOD OF HANDLING OFFLOAD PARAMETER ACCORDING TO CELL SELECTION

CROSS REFERENCE TO RELATED APPLICATIONS

This application claims the benefit of U.S. Provisional Application No. 62/146,028, filed on Apr. 10, 2015, which is incorporated herein by reference.

BACKGROUND OF THE INVENTION

1. Field of the Invention

The present invention relates to a device and a method used in a wireless communication system, and more particularly, to a device and a method of handling an offload parameter according to a cell selection in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to a wireless local area network (WLAN) operated in an unlicensed band, to ease load of the network traffic. For example, the eNB may provide services to the UE via the WLAN. However, according to the 3GPP standard, it is not known how the UE handles one or more dedicated WLAN offload parameters after the UE performs a cell selection procedure. In one example, the UE may perform a cell selection procedure, after the UE transfers from a connected mode to an idle mode. The UE may not communicate with the eNB correctly, if the dedicated WLAN offload parameter(s) is not handled properly. Thus, how to handle the dedicated WLAN offload parameter(s) according to the cell selection procedure is an important problem to be solved.

SUMMARY OF THE INVENTION

The present invention therefore provides a communication device and method for handling an offload parameter to solve the abovementioned problem.

A communication device of handling an offload parameter according to a cell selection comprises a storage unit for storing instructions and a processing means coupled to the storage unit. The processing means is configured to execute the instructions stored in the storage unit. The instructions comprise receiving at least one dedicated wireless local area network (WLAN) offload parameter and a dedicated WLAN offload timer from a first cell in a connected mode; receiving a radio resource control (RRC) connection release message from the first cell; starting the dedicated WLAN offload timer; performing a cell selection procedure in response to the RRC connection release message; selecting a second cell according to the cell selection procedure; stopping the dedicated WLAN offload timer; and releasing the at least one dedicated WLAN offload parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
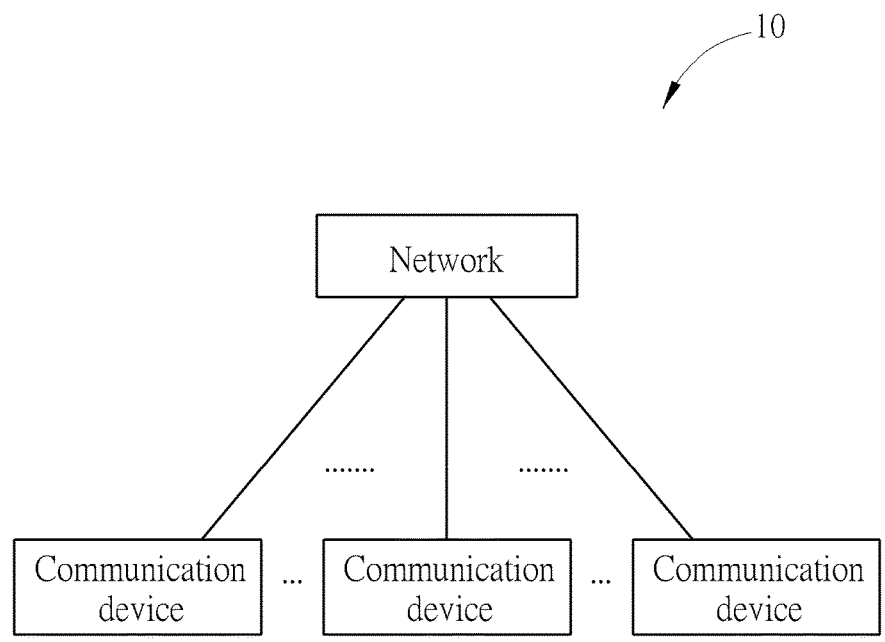
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band (s) and/or unlicensed band (s). The network and the communication device may simultaneously communicate with each other via multiple cells (e.g., multiple carriers) including a primary cell (e.g., primary component carrier (CC)) and one or more secondary cells (e.g., secondary component carriers). The abovementioned cells may be operated in the same or different duplexing modes, i.e. frequency-division duplexing (FDD) and time-division duplexing (TDD). For example, the primary cell may be operated on licensed carrier(s), while the secondary cell may be operated on unlicensed carrier(s).

In FIG. 1, the network and the communication devices are simply utilized for illustrating the structure of the wireless communication system 10. Practically, the network can be a universal terrestrial radio access network (UTRAN) comprising at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

A communication device may be a user equipment (UE), a low cost device (e.g., machine type communication (MTC) device), a device-to-device (D2D) device, a mobile phone, a laptop, a tablet computer, an electronic book, a portable computer system, a vehicle, airplane or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
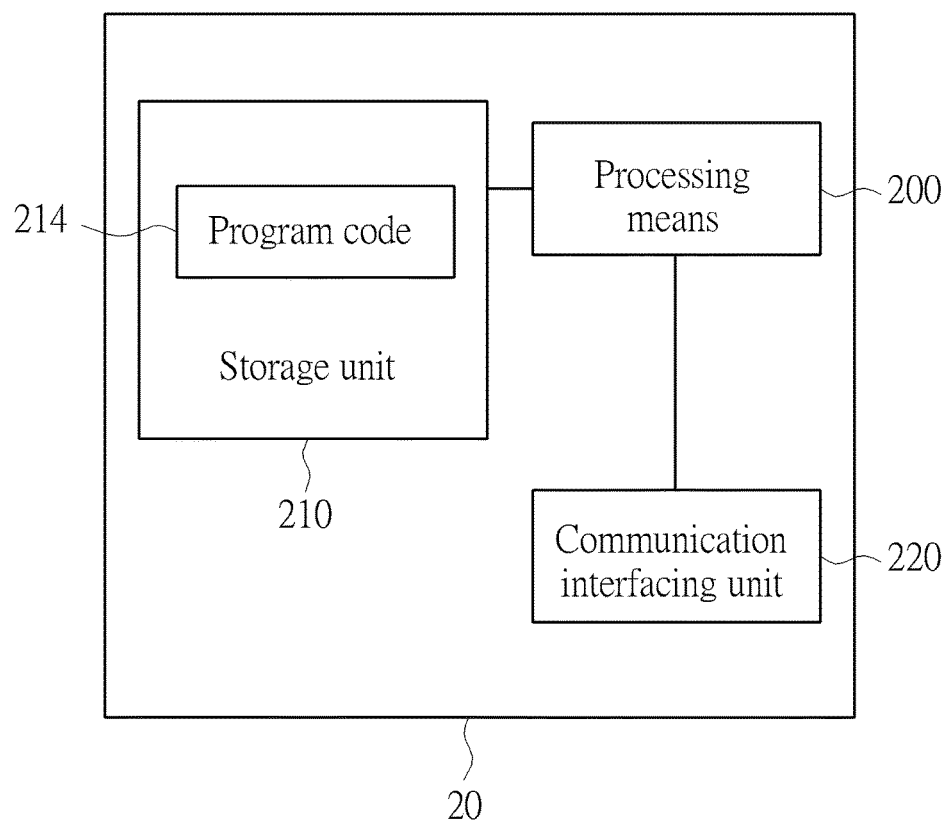
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
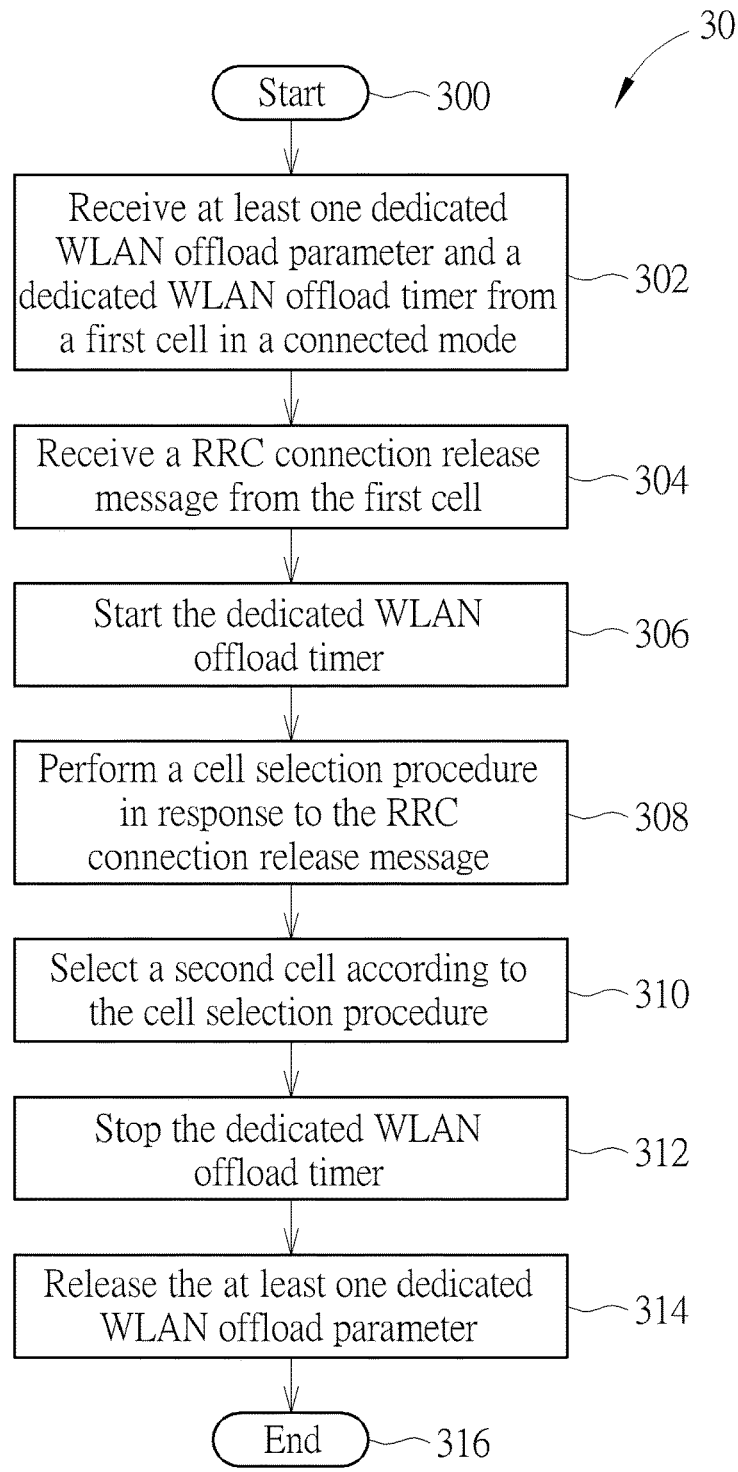
FIG. 3 is a flowchart of a process according to an example of the present invention.

FIG. 3 is a flowchart of a process 30 according to an example of the present invention. The process 30 may be utilized in a communication device in FIG. 1, to handle an offload parameter. The process 30 may be compiled into the program code 214 and includes the following steps:

Step 300: Start.

Step 302: Receive at least one dedicated WLAN offload parameter and a dedicated WLAN offload timer from a first cell in a connedted mode.

Step 304: Receive a radio resource control (RCC) connection release message from the first cell.

Step 306: Start the dedicated WLAN offload timer.

Step 308: Perform a cell selection procedure in response to the RRC connection release message.

Step 310: Select a second cell according to the cell selection procedure.

Step 312: Stop the dedicated WLAN offload timer.

Step 314: Release the at least one dedicated WLAN offload parameter.

Step 316: End.

According to the process 30, the communication device may receive at least one dedicated WLAN offload parameter and a dedicated WLAN offload timer from a first cell in a connected mode. The communication device may receive a radio resource control (RRC) connection release message from the first cell. The communication device may start the dedicated WLAN offload timer, and may perform a cell selection procedure in response to the RRC connection release message. The communication device may select a second cell according to the cell selection procedure, and may stop the dedicated WLAN offload timer. In one example, the communication device may perform the cell selection procedure, after the communication device transfers from the connected mode to an idle mode. In one example, the first cell and the second cell may be different cells. Accordingly, the communication device may release the at least one dedicated WLAN offload parameter. That is, the communication device releases the WLAN offload parameter(s) received from the first cell after selecting the second cell according to the cell selection procedure. Thus, the communication device may communicate with the second cell correctly.

Realization of the process 30 is not limited to the above description.

In one example, the at least one WLAN offload parameter and the dedicated WLAN offload timer may be received in a RRC connection reconfiguration, a radio bearer reconfiguration, a cell update response, a handover message, a RRC connection setup message or a RRC connection re-establishment message transmitted by the first cell. In one example, the dedicated WLAN offload timer may be T350 in a LTE system, or may be T330 in a UMTS. In one example, the communication device may stop the dedicated WLAN offload timer, if the first cell and the second cell are different cells. In another example, the communication device may not start the dedicated WLAN offload timer.

In one example, the communication device may release the at least one dedicated WLAN offload parameter, after stopping the dedicated WLAN offload timer. In one example, the communication device may keep running the dedicated WLAN offload timer and does not release the at least one dedicated WLAN offload parameter, when the first cell and the second cell are the same cell. In one example, the communication device may release the at least one dedicated WLAN offload parameter, after the dedicated WLAN offload timer is expired.

In one example, the at least one dedicated WLAN offload parameter may be wlan-OffloadConfigDedicated in a LTE system, or may be WLAN_OFFLOAD_INFO in a UMTS. In one example, the communication device may apply at least one common WLAN offload parameter, after releasing the at least one dedicated WLAN offload parameter. In one example, the at least one common WLAN offload parameter may be wlan-OffloadConfigCommon in a LTE system, or may be SYSTEM_INFO_WLAN_OFFLOAD_INFO in a UMTS. In one example, the at least one common WLAN offload parameter may be received in system information transmitted by the second cell. In one example, the at least one dedicated WLAN offload parameter may be received in a RRC connection reconfiguration, a radio bearer reconfiguration, a cell update response, a handover message, a RRC connection setup message or a RRC connection re-establishment message transmitted by the first cell.

In one example, the first cell and the second cell may belong to the same base station or different base stations. In one example, the first cell and the second cell may belong to the same public land mobile network (PLMN) or different PLMNs. In one example, the first cell and the second cell may belong to the same radio access technology (RAT) or different RATs.

Figure 4:
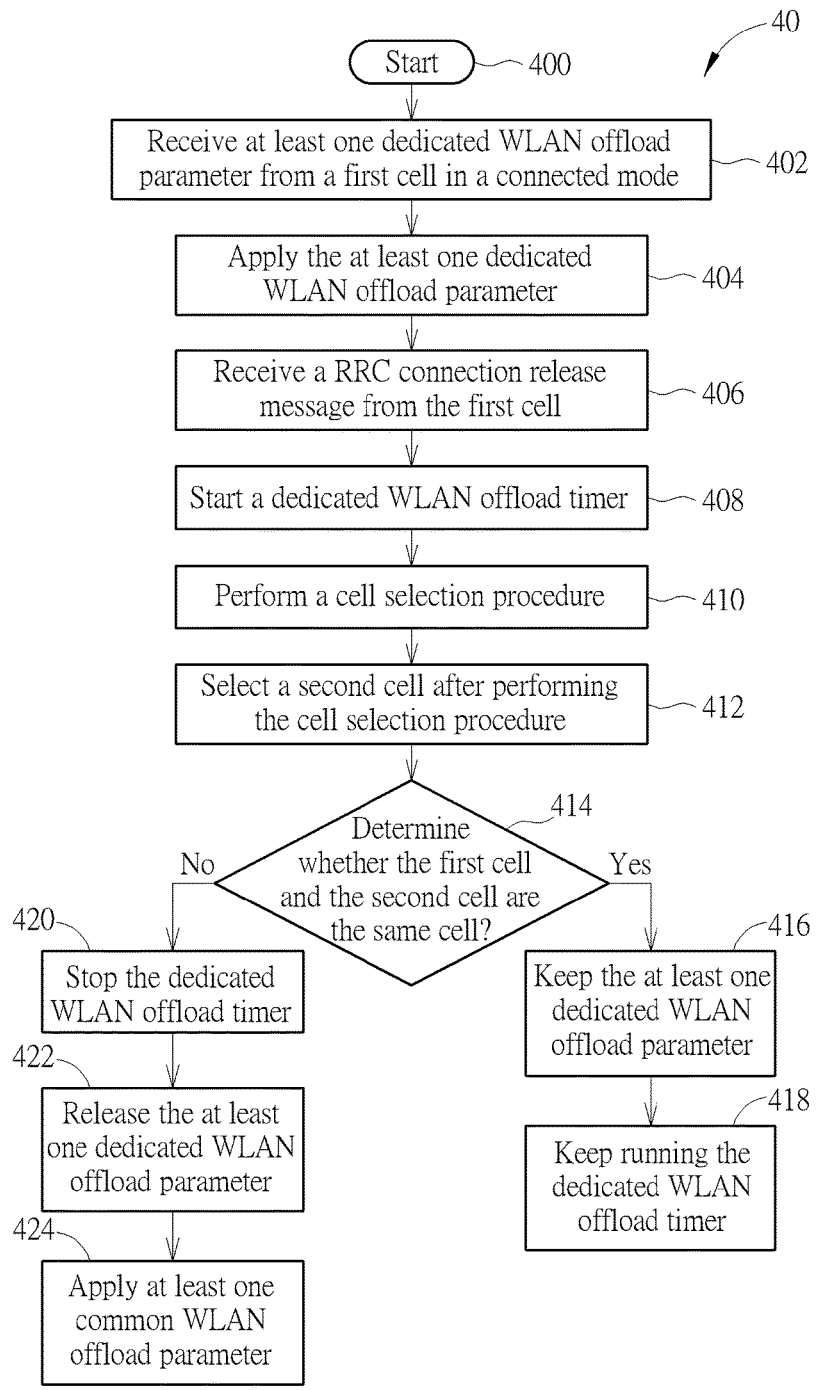
FIG. 4 is a flowchart of a process according to an example of the present invention.

FIG. 4 is a flowchart of a process 40 according to an example of the present invention, and is illustrated according to the above description. The process 40 may be utilized in a communication device in FIG. 1, to handle an offload parameter. The process 40 may be compiled into the program code 214 and includes the following steps:

Step 400: Start.

Step 402: Receive at least one dedicated WLAN offload parameter from a first cell in a connected mode.

Step 404: Apply the at least one dedicated WLAN offload parameter.

Step 406: Receive a RRC connection release message from the first cell.

Step 408: Start a dedicated WLAN offload timer.

Step 410: Perform a cell selection procedure.

Step 412: Select a second cell after performing the cell selection procedure.

Step 414: Determine whether the first cell and the second cell are the same cell. If yes, perform step ; otherwise, perform step 420.

Step 416: Keep the at least one dedicated WLAN offload parameter.

Step 418: Keep running the dedicated WLAN offload timer.

Step 420: Stop the dedicated WLAN offload timer.

Step 422: Release the at least one dedicated WLAN offload parameter.

Step 424: Apply at least one common WLAN offload parameter.

Figure 5:
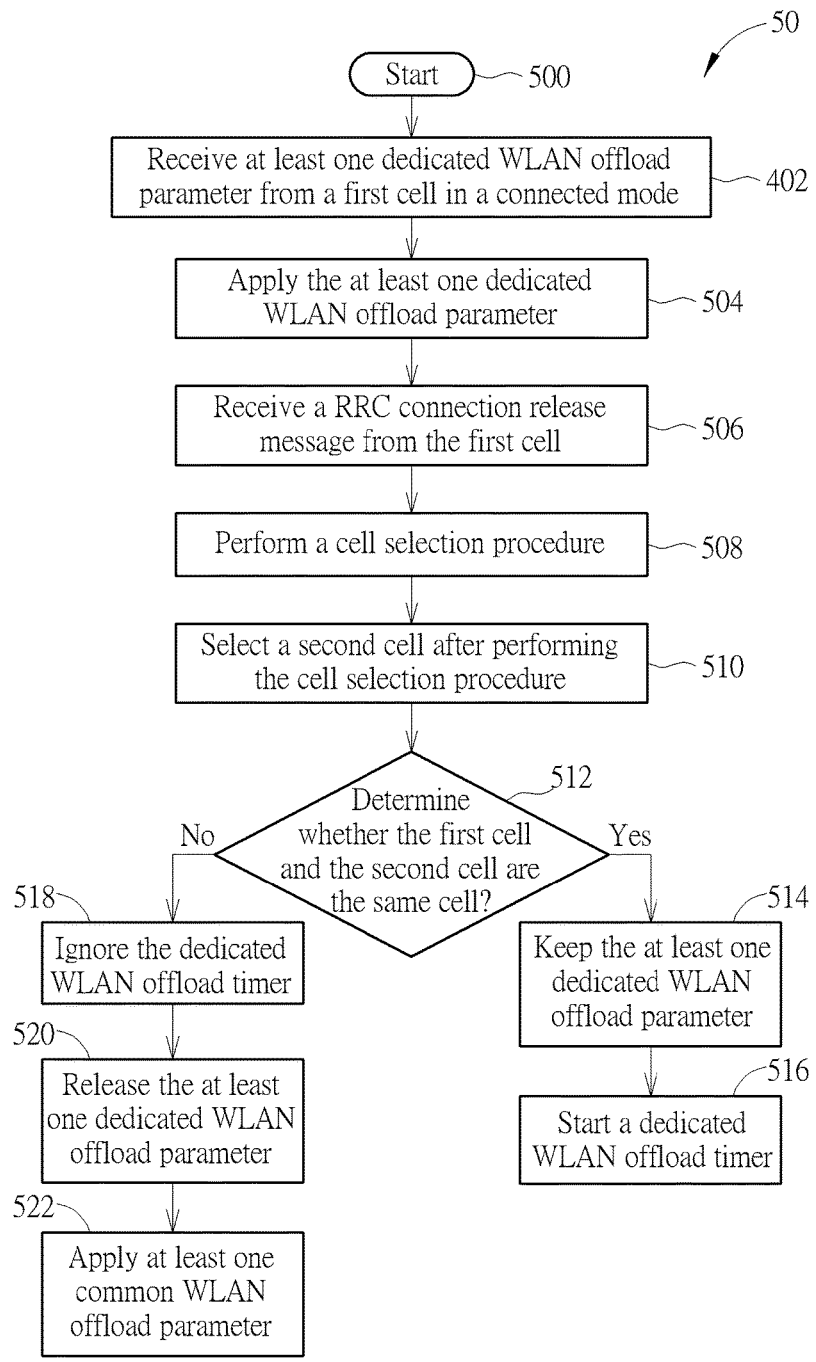
FIG. 5 is a flowchart of a process according to an example of the present invention.

FIG. 5 is a flowchart of a process 50 according to an example of the present invention, and is illustrated according to the above description. The process 50 may be utilized in a communication device in FIG. 1, to handle an offload parameter. The process 50 may be compiled into the program code 214 and includes the following steps:

Step 500: Start.

Step 502: Receive at least one dedicated WLAN offload parameter from a first cell in a connected mode.

Step 504: Apply the at least one dedicated WLAN offload parameter.

Step 506: Receive a RRC connection release message from the first cell.

Step 508: Perform a cell selection procedure.

Step 510: Select a second cell after performing the cell selection procedure.

Step : Determine whether the first cell and the second cell are the same cell. If yes, perform step 514; otherwise, perform step 518.

Step 514: Keep the at least one dedicated WLAN offload parameter.

Step 516: Start a dedicated WLAN offload timer.

Step 518: Ignore the dedicated WLAN offload timer.

Step 520: Release the at least one dedicated WLAN offload parameter.

Step 522: Apply at least one common WLAN offload parameter.

It should be noted that although the examples are illustrated based on the process 30, to clarify the operations of the communication device. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method of handling an offload parameter. Thus, the communication device releases WLAN offload parameter(s) received from a first cell after selecting a second cell according to a cell selection procedure. As a result, the communication device may communicate with the second cell correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling an offload parameter according to a cell selection, comprising:
    a storage unit, for storing instructions of:
    receiving at least one dedicated wireless local area network (WLAN) offload parameter and a dedicated WLAN offload timer from a first cell in a connected mode, wherein the at least one dedicated WLAN offload parameter is wlan-OffloadConfigDedicated in a long term evolution (LTE) system, or is WLAN_OFFLOAD_INFO in a universal mobile telecommunications system (UMTS);
    receiving a radio resource control (RRC) connection release message from the first cell;
    starting the dedicated WLAN offload timer;
    performing a cell selection procedure in response to the RRC connection release message, after starting the dedicated WLAN offload timer;
    selecting a second cell according to the cell selection procedure;
    stopping the dedicated WLAN offload timer, after selecting the second cell; and
    releasing the at least one dedicated WLAN offload parameter; and
    a processing means, coupled to the storage unit, configured to execute the instructions stored in the storage unit.

2. The communication device of claim 1, wherein the first cell and the second cell are different cells.

3. The communication device of claim 1, wherein the at least one WLAN offload parameter and the dedicated WLAN offload timer are received in a RRC connection reconfiguration, a radio bearer reconfiguration, a cell update response, a handover message, a RRC connection setup message or a RRC connection re-establishment message transmitted by the first cell.

4. The communication device of claim 1, wherein the dedicated WLAN offload timer is T350 in a LTE system, or is T330 in a UMTS.

5. The communication device of claim 1, wherein the communication device stops the dedicated WLAN offload timer, if the first cell and the second cell are different cells.

6. The communication device of claim 5, wherein the communication device releases the at least one dedicated WLAN offload parameter, after stopping the dedicated WLAN offload timer.

7. The communication device of claim 1, wherein the communication device keeps running the dedicated WLAN offload timer and does not release the at least one dedicated WLAN offload parameter, when the first cell and the second cell are the same cell.

8. The communication device of claim 1, wherein the communication device releases the at least one dedicated WLAN offload parameter, after the dedicated WLAN offload timer is expired.

9. The communication device of claim 1, wherein the communication device apply at least one common WLAN offload parameter, after releasing the at least one dedicated WLAN offload parameter.

10. The communication device of claim 9, wherein the at least one common WLAN offload parameter is wlan-OffloadConfigCommon in the LTE system, or is SYSTEM_INFO_WLAN_OFFLOAD_INFO in the UMTS.

11. The communication device of claim 9, wherein the at least one common WLAN offload parameter is received in system information transmitted by the second cell.

12. The communication device of claim 1, wherein the first cell and the second cell belong to a same base station or different base stations.

13. The communication device of claim 1, wherein the first cell and the second cell belong to a same public land mobile network (PLMN) or different PLMNs.

14. The communication device of claim 1, wherein the first cell and the second cell belong to a same radio access technology (RAT) or different RATs.

* * * * *